(12) United States Patent
Fevre et al.

(10) Patent No.: US 9,101,248 B2
(45) Date of Patent: Aug. 11, 2015

(54) FOOD PROCESSOR WITH A PROTECTED LID

(71) Applicant: HAMEUR S.A., Luxembourg (LU)

(72) Inventors: Loïc Xavier Fevre, Sanvignes les Mines (FR); Nicolas Lapray, Montceau en Bourgogne Cedex (FR)

(73) Assignee: HAMEUR S.A., Luxembourg (LU)

( * ) Notice: Subject to any disclaimer, the term of this patent is extended or adjusted under 35 U.S.C. 154(b) by 285 days.

(21) Appl. No.: 13/629,404

(22) Filed: Sep. 27, 2012

(65) Prior Publication Data
US 2013/0075505 A1 Mar. 28, 2013

(30) Foreign Application Priority Data
Sep. 28, 2011 (FR) .................................... 11 58704

(51) Int. Cl.
| | |
|---|---|
| *B02C 18/12* | (2006.01) |
| *A47J 43/07* | (2006.01) |
| *A47J 43/046* | (2006.01) |
| *A47J 36/10* | (2006.01) |

(52) U.S. Cl.
CPC .............. *A47J 43/0716* (2013.01); *A47J 36/10* (2013.01); *A47J 43/046* (2013.01); *B02C 18/12* (2013.01)

(58) Field of Classification Search
CPC . A47J 43/0777; A47J 43/0772; A47J 43/046; A47J 43/0716; A47J 36/10; A47J 43/255; A47J 43/0722; A47J 43/0711; B02C 19/186; B02C 13/09; B02C 18/12; A01F 29/095; B26D 1/29

USPC ................ 241/37.5, 65, 91, 92, 278.1, 282.1, 241/282.2
See application file for complete search history.

(56) References Cited

U.S. PATENT DOCUMENTS

| | | | | |
|---|---|---|---|---|
| 4,711,366 | A * | 12/1987 | Chen .............................. | 220/316 |
| 5,310,981 | A * | 5/1994 | Sarnoff et al. ................. | 219/731 |
| 5,634,566 | A | 6/1997 | Jansen et al. | |
| 6,474,578 | B1 * | 11/2002 | Gonneaud et al. ........... | 241/37.5 |
| 6,637,681 | B1 * | 10/2003 | Planca et al. .................. | 241/37.5 |
| 6,986,475 | B2 * | 1/2006 | Wanat .......................... | 241/37.5 |

(Continued)

FOREIGN PATENT DOCUMENTS

| | | |
|---|---|---|
| EP | 1269898 A1 | 1/2003 |
| FR | 2605207 A1 | 4/1988 |

(Continued)

*Primary Examiner* — Faye Francis
*Assistant Examiner* — Onekki Jolly
(74) *Attorney, Agent, or Firm* — IM IP Law PLLC; C. Andrew Im

(57) ABSTRACT

The present invention relates to a mechanical food treatment processor comprising a driving block topped by a bowl. The driving block comprises a motor connected to a rotation driving means. The processor further comprises a food treatment tool with means of coupling with the rotation driving means. The bowl is topped by a lid with an opening/closing system placed on the bowl and operable to rotate about a substantially vertical axis. The lid is provided with a safety device operable to block the opening of the lid when a force, substantially parallel to the axis of rotation, is exerted on the lid. The claimed device is operable to avoid a brutal ejection of the lid and/or emissions of extreme burning steam in the event of an overpressure in the bowl.

12 Claims, 3 Drawing Sheets

(56) References Cited

U.S. PATENT DOCUMENTS

| | | | |
|---|---|---|---|
| 7,185,837 B2 * | 3/2007 | Oliver et al. | 241/282.1 |
| 7,530,510 B2 * | 5/2009 | Newman et al. | 241/92 |
| 7,686,240 B2 * | 3/2010 | Pryor et al. | 241/36 |
| 2005/0047272 A1 | 3/2005 | Sands | |
| 2006/0261066 A1 | 11/2006 | Boozer et al. | |
| 2008/0111011 A1 * | 5/2008 | Wang | 241/37.5 |
| 2011/0011281 A1 | 1/2011 | Allen | |

FOREIGN PATENT DOCUMENTS

| | | |
|---|---|---|
| FR | 2641458 A1 | 7/1990 |
| FR | 2890551 A1 | 3/2007 |
| GB | 261370 A | 4/1927 |

* cited by examiner

FOOD PROCESSOR WITH A PROTECTED LID

RELATED APPLICATIONS

This application claims priority from French Patent Application No. 11 58704 filed Sep. 28, 2011, which is incorporated herein by reference in its entirety.

TECHNICAL FILED OF THE INVENTION

The present invention refers to a mechanical food processor. More precisely, the present invention refers to a food processor such as a blender or a "cutter".

BACKGROUND OF THE INVENTION

Such a processor is well known in the prior art. It typically comprises a driving block topped by a bowl. The driving block comprises a driving shaft able to rotate about an axis which is vertical or nearly vertical. A treatment tool, generally comprising cutting blades, is placed in the bowl on the driving shaft. The cutting blades can thus ensure the cutting or the mixing of the food placed in the bowl, such as fruits or vegetables. Such a food processor is described for example in document FR2641458.

In a conventional way, such a processor comprises a lid able to fit the bowl. This lid ensures in particular the user's safety, by preventing her/him from introducing a limb into the bowl when the treatment tool is working. The lid also avoids splashes towards outside, which could prove to be dangerous in the case of a hot preparation. It is indeed possible to provide the bowl with a food heating device.

It is traditional to provide the lid and/or the bowl with a safety device connected to the power supply for the motor, so that said motor can work only when the lid is in a closing position on the bowl. Such a device is described in particular in documents EP1269898 and FR2890551.

However, even if the motor stops, accidents can occur when opening the lid. When the rotating processor is working, a column of liquid can be formed inside the bowl, this column needs a few moments for going down again after the motor has stopped. This column of liquid can exert a pressure on the lid. In the same way, heating the contents in the bowl can cause the steam pressure to be risen inside said bowl, when the latter contains a significant quantity of water.

When a user actuates an unlocking device for the lid, said pressure is released and can brutally eject said lid and/or generate a jet of hot liquid or steam, which is dangerous for the user.

There is thus a need to make the opening of the lid of such a processor more safe, even if the motor has stopped.

OBJECT AND SUMMARY OF THE INVENTION

An aspect of the present invention enables to solve this problem. Indeed, this aspect of the invention implements a safety device for the opening of the lid, activated when there is a significant overpressure in the bowl.

More precisely, an object of the present invention is a mechanical food processor, said processor comprising a driving block topped by a bowl, the driving block comprising a motor connected to a rotation driving means, the processor moreover comprising a food treatment tool, provided with means of coupling with the rotation driving means, the bowl being topped by a lid, said lid being provided with a opening/closing system placed on the bowl and able to rotate about a substantially vertical axis, the processor being characterized in that the lid is provided with a safety device allowing to block the opening of the lid when a force, substantially parallel to the axis of rotation, is exerted on said lid.

By "substantially vertical axis", one understands that the axis of rotation can be vertical or slightly tilted with respect to the vertical. Preferably, the angle of inclination is not higher than 30°.

In a preferential way, the lid is able to pivot with respect to the bowl, between a closing position and an opening position, the closing position enabling the motor to work and the opening position enabling to raise the lid; moreover, the opening position is at an angular distance α from the closing position and the safety device comprises a blocking means for blocking the lid in a blocking position at an angular distance β from the closing position, with 0<β<α.

In a preferential way, the safety device comprises at least one means supported by the bowl, cooperating with at least one means supported by the lid, in order that a rotation of said lid about the axis of rotation is blocked when a force, substantially parallel to said axis, is exerted on said lid.

In a preferential way, the processor comprises a second safety device which prevents the motor from working when the lid is not in the closing position on the bowl. Such a second device is known from the state of the art, as previously mentioned.

Preferably, the second safety device prevents the motor from working when the lid deviates by an angle γ from the closing position, with 0≤γ<β. Thus, when the lid reaches the blocking position, the motor necessarily stops.

In a preferential way, a connection between the bowl and the lid are provided with a seal comprising a substantially cylindrical part disposed along the axis of the bowl, a dimension of said seal along said axis being sufficient to maintain the connection tight when the lid is in the blocking position. Indeed, the blocking position corresponds to a slight heightened position of the lid with respect to the bowl.

In addition, it can be advantageous to provide the lid with an opening of reduced size with respect to the size of said lid. Such an opening enables to introduce food into the bowl when the treatment tool is working. This possibility is advantageous for example when preparing an oil-in-water emulsion, in which fat can be added progressively.

In a traditional way, the treatment tool is centered with respect to the bowl. It is thus advantageous to place the opening off centre in the lid, in order to prevent the food introduced from falling directly on the tool.

However, when the treatment tool rotates at a high speed, a column of liquid can be formed along a vertical wall of the bowl. A part of the liquid is then likely to overflow through the off-centre opening.

Another aspect of the present invention enables to solve this problem. More precisely, another object of the present invention is a mechanical food processor, said processor comprising a driving block topped by a bowl having a substantially cylindrical shape along a substantially vertical axis, the bowl being topped by a lid, the driving block comprising a motor connected to a rotation driving means, the processor moreover comprising a food treatment tool provided with means of coupling with the rotation driving means, the processor being characterized in that: the lid is provided with at least one opening for introducing food into the bowl, said opening being off-centered with respect to the axis of the bowl; an internal wall of the lid supports a surface having a substantially cylindrical shape, oriented towards a periphery of the lid, located between the introduction opening and said periphery of the lid; when the lid is positioned on the bowl, said surface is substantially centered on the axis of the bowl.

This surface enables to contain a column of liquid formed by centrifugation, so as to avoid an overflow of liquid through the food introduction opening.

The expression "substantially vertical axis" is understood as previously indicated.

In a preferential way, an internal side wall of the bowl is located at a radial distance from the surface, said radial distance being selected according to a volume of liquid that can be treated in the bowl. The volume formed by the bowl at this radial distance corresponds preferentially to a maximum volume that can be treated by the processor.

It is sometimes advantageous to be able to close the food introduction opening in order to have a closed lid. In a preferential way, the lid is thus provided with a shaft mounted so as to rotate about the axis of the bowl, said shaft being firmly fixed to a panel closing the food introduction opening, said panel being configured so as to make said opening alternately open and close when the shaft is rotating.

In a more preferential way, the shaft mounted on the lid is provided with a handle located outside said lid, said handle being substantially opposite the closing panel. Thus, the opening is closed when the operator's hand passes above said opening, which avoids possible steam burns.

According to an embodiment of the invention, the shaft mounted on the lid is provided with a scraping arm able to remove food from an internal side wall of the bowl. Such a scraping arm is known from the state of the art, for example from document FR2605207. A scraping arm can also be designed to remove food from an internal wall of the lid.

It is advantageous to combine in the same processor the invention concerning the overpressure-related safety device and the invention concerning the food introduction opening. The safety device is particularly useful when the introduction opening is provided with a closing panel.

In a preferential way, the lid of a processor such as previously described comprises a conduit for evacuating steams from the bowl. Preferentially, said conduit comprises a first end close to a centre of the lid and leading into the bowl, as well as a second end offset from said centre and leading to the outside of the bowl. This embodiment is particularly advantageous when the lid comprises an off-centered food introduction opening provided with a closing shutter. Thus, when said opening is closed, steams can escape through the conduit.

In a preferential way, a processor as previously described comprises a food heating device. Thus, it combines a mechanical treatment function with a heating and/or cooking function.

BRIEF DESCRIPTION OF THE DRAWINGS

The invention will be better understood when reading the following description and examining the annexed Figures. These Figures are given as an indication and by no means as a restriction of the invention. The Figures show.

DETAILED DESCRIPTION OF THE EMBODIMENTS

Figure 1:
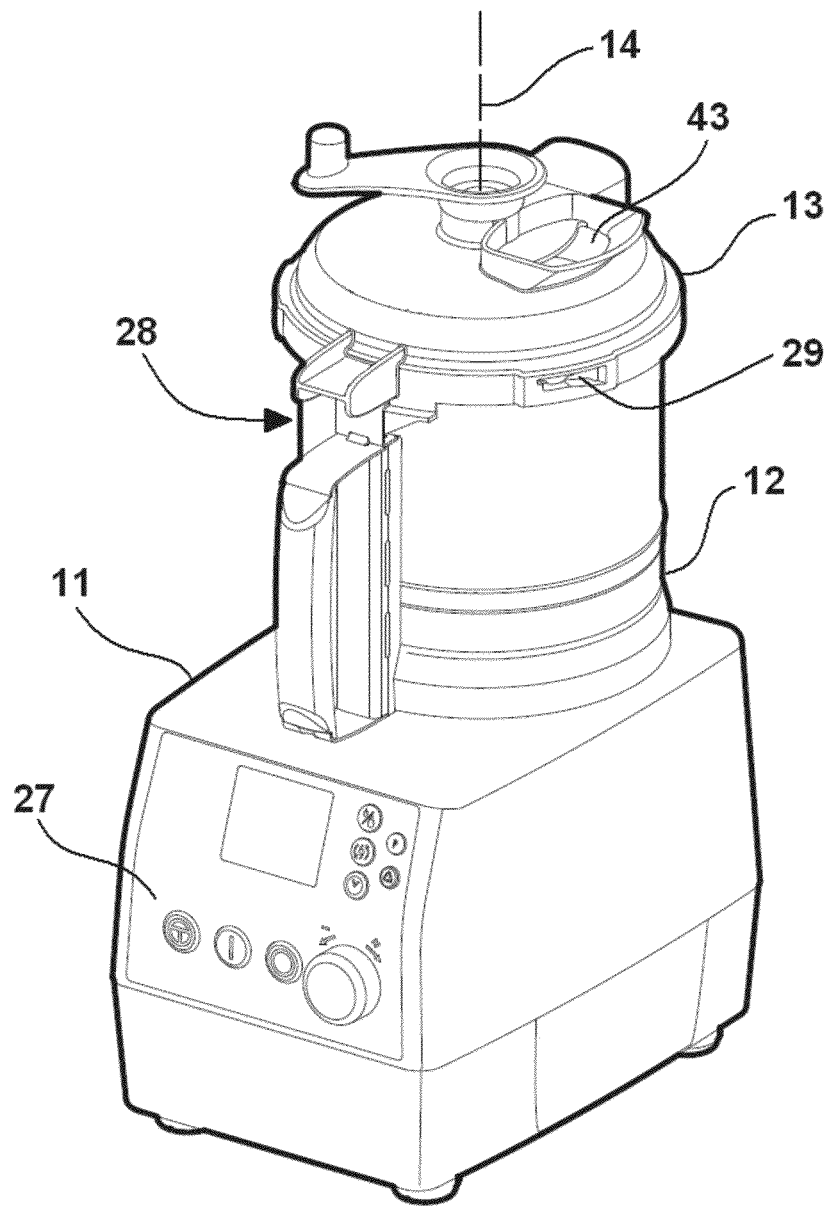
FIG. 1: a perspective view of a food processor according to an embodiment of the invention.

FIG. 1 shows a perspective view of a food processor according to an embodiment of the invention. The processor 10 comprises a driving block 11 topped by a bowl 12. The bowl 12 itself is topped by a lid 13. The bowl 12 has a substantially cylindrical shape of revolution and is disposed along a substantially vertical axis 14.

Figure 2:
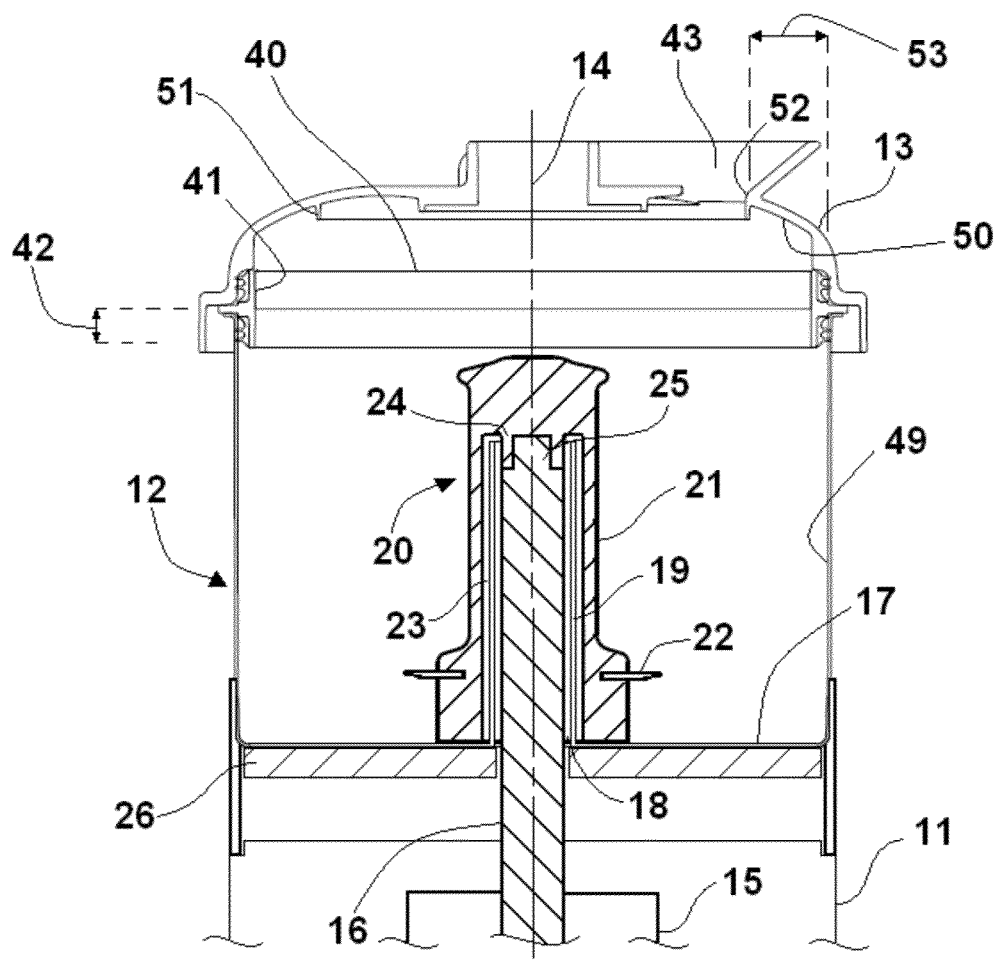
FIG. 2: a partial schematic sectional view of the processor in FIG. 1.

FIG. 2 represents a partial schematic view of the processor 10 in a vertical sectional passing through the axis 14. The driving block 11 comprises a motor 15 represented schematically in FIG. 2. The motor 15 is connected to a driving means, in fact a driving shaft 16, having of a substantially cylindrical shape and disposed along the axis 14.

A bottom 17 of the bowl 12 comprises an opening 18 allowing the passage of the driving shaft 16. In the example in FIG. 2, the opening 18 is prolonged by a conduit 19, located inside the bowl 12 and disposed along the axis 14.

The processor 10 moreover comprises a food treatment tool, in fact a knife 20. The knife 20 comprises a support 21 provided with at least one blade 22. The action of the knife 20 enables in particular to reduce in pieces or in fine particles food introduced into the bowl 12.

The support 21 comprises a central cavity 23 having a substantially cylindrical shape, which allows said support to be spanned onto the conduit 19 and the shaft 16. A bottom 24 of the cavity 23 is provided with means of assembling with an end 25 of the shaft 16, so that said shaft is able to rotate the knife 20 about the axis 14.

In addition, in the example represented in FIG. 2, the bowl 12 is provided with a food heating device 26. The device 26 is fixed for example under the bottom 17. This device 26 is for example a heating resistance. According to an alternative embodiment, the processor 10 is provided with an induction heating device.

The device 26 allows to heat or cook the food introduced into the bowl 12. The combined action of the knife 20 and the device 26 thus allows to carry out hot fluid preparations, such as soups or sauces.

The power supply of the motor 15 and the heating device 26 can be controlled by a user, via a control panel 27 (FIG. 1) located on the driving block.

FIG. 1 represents the lid 13 in a so-called closing position on the bowl 12. Said bowl 12 and said lid 13 are provided with a first safety device 28, which prevents the motor 15 from working when the lid is not in the closing position on the bowl. The device 28 comprising for example a safety pin (not represented) connected to a switch (not represented), said switch deactivating the power supply of the motor 15 when the lid leaves the closing position. Such a device is described in particular in document FR2890551, which is incorporated herein by reference in its entirety.

The device 28 can be implemented so that a displacement of the lid 13 from the closing position causes the motor 15 to be stopped. Alternatively, the device 28 can block the lid 13 in the closing position until the motor 15 stops.

Figure 3:
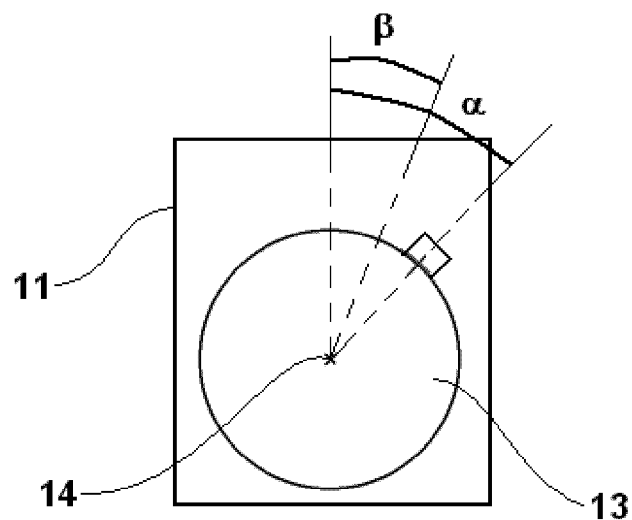
FIG. 3: a schematic top view of a food processor according to an embodiment of the invention.

For opening the lid 13 in order to access the contents of the bowl 12, said lid must be first rotated about the axis 14 from its closing position. FIG. 3 shows a schematic top view of an processor similar to the processor 10.

The lid 13 and the bowl 12 are provided with a second safety device 29, which prevents in particular the lid 13 from opening too abruptly, in the event of an overpressure on the lid inside the bowl. The device 29 allows in particular to rotate the lid 13 by an angle α about the axis 14 from the opening position, in order to reach a so-called opening position represented in FIG. 3. When this opening position is reached, the lid 13 can be raised from the bowl 12 to give access to the inside of the bowl.

In the event of an overpressure when opening the lid 13, a second device 29 allows to block said lid in a so-called blocking position, corresponding to a rotation by an angle β about the axis 14 from the closing position. The angle β is higher than 0 and lower than angle α.

Figure 4:
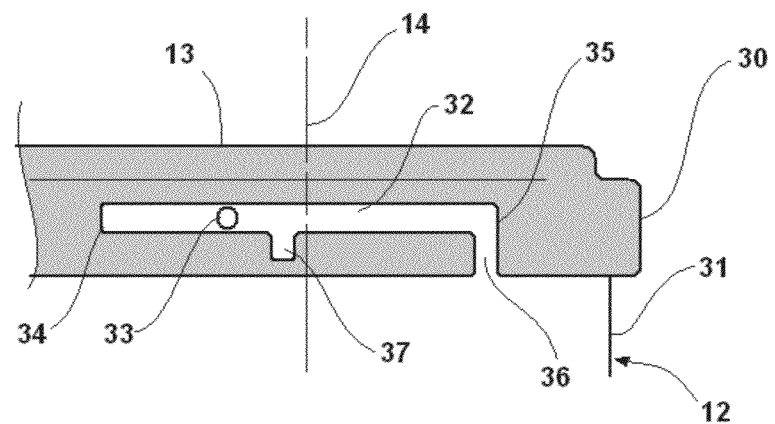
FIG. 4: a schematic view of a safety device for a food processor according to an embodiment of the invention.

FIG. 4 shows a detailed view of a possible example of configuration of the second safety device 29.

One can see the lid 13, positioned on the bowl 12. In this example, the lid 13 comprises a substantially cylindrical external shoulder 30 having an axis 14. When the lid is positioned on the bowl, the shoulder 30 surrounds an external wall 31 of said bowl.

The shoulder 30 comprises a slit 32 disposed in a plane perpendicular to the axis 14. The wall 31 comprises a projection 33 having such a configuration that it can slide in the slit 32 when the lid 13 rotates about the axis 14 with respect to the bowl 12.

When the lid is in the closing position, the projection 33 is near a first closed end 34 of the slit 32. When the lid is pivoted in order to reach the opening position, the projection gets close to a second end 35 of said slit. The end 35 comprises an opening 36 leading to a lower edge of the shoulder 30. When the lid is in the opening position, the projection 33 is opposite the opening 36. One can thus raise the lid along the axis 14 without said lid not being retained on the bowl by the projection 33.

When a column of water in the bowl 12 and/or a steam overpressure is formed, the lid 13 is submitted to an upwards vertical force; it thus tends to be raised during its displacement between the closing and opening positions. To avoid a brutal ejection of the lid and/or an emission of steam or hot liquid, the shoulder 30 comprises a notch 37, substantially parallel to the axis 14. Said notch 37 corresponds to the above-mentioned position of the lid, the so-called blocking position. Said notch 37 is provided at a position lower than the slit 32 along the axis 14. An upper end of said the notch leads into said slit 32, the other lower end is closed.

Under the action of the upwards force exerted on the lid during the displacement thereof towards the opening position, the projection 33 enter the notch 37 before reaching the end 35 of the slit 32. The projection 33 abuts against the lower end of the notch 37, which prevents the lid from raising. This abutment enables the lid 13 to keep the blocking position.

If the pressure on the lid is due to steam, the operator can then implement an evacuation of the pressure in the bowl, through means that will be described below. The fall of the pressure enables the lid to go down again so that the projection 33 can carry on moving in the slit 32 towards the opening position. If the pressure is caused by a water column, the lid leaves the blocking position and is controllable again as soon as the liquid goes down again.

It is obviously possible to configure the device 29 according to a technical solution different from that represented in FIG. 4, while remaining within the scope of this invention.

It is possible that the first of safety device 28 allows a displacement range for the lid from the closing position. More particularly, the first safety device prevents the motor from working when the lid deviates from an angle γ from the closing position, the angle γ being superior or equal to 0. Preferably, γ is lower than β. Thus, when the lid reaches the blocking position, the motor necessarily stops.

Preferentially, as in the embodiment represented in FIG. 2, a connection between the bowl 12 and the lid 13 is provided with a seal 40. The seal 40 comprises a substantially cylindrical part 41, disposed along the axis 14 when the lid is in the closing position. An external surface of the part 41 comes into contact with internal walls of the bowl and the lid and exerts a radial pressure on said internal walls.

The joint 40 is configured so that a dimension 42 of the part 41 along the axis 14 is sufficient to maintain the tightness when the lid is in the blocking position, i.e. for example when the projection 33 (FIG. 4) abuts against the lower end of the notch 37. When the safety device 29 has the configuration represented in FIG. 4, the dimension 42 thus corresponds at least to the depth of the notch 37 along the axis 14.

In a preferential way, a contact surface between the lid 13 and the seal 40 substantially have the same diameter as the bowl 12. Preferentially, the seal 40 has a plane of symmetry which is substantially perpendicular to the axis 14, so as to be able to be assembled with the unit bowl/lid in two possible positions.

In the embodiment represented in FIGS. 1 and 2, for eliminating an overpressure in the bowl 12 when the lid 13 is blocked as previously described, the operator can open an opening 43 located on said lid.

One of the functions of the opening 43 is to allow the introduction of food into the bowl 12 when the motor 15 is working. The opening 43 is advantageously off-centered with respect to the axis 14, so that the food falls in the preparation and not on the knife 20.

Figure 5:
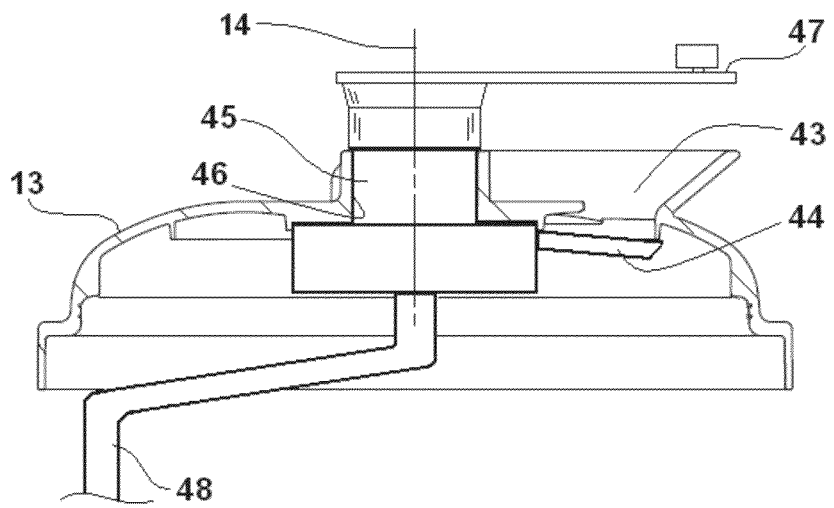
FIG. 5: a sectional view of a lid of a processor according to an embodiment of the invention.

FIG. 5 shows a sectional view of the lid 13 of the processor in FIG. 1. The opening 43 can be opened or closed by means of a closing panel 44. When the lid 13 is positioned on the bowl 12, the panel 44 is inside the volume delimited by the unit bowl/lid.

Preferentially, the panel 44 is mounted on the lid 13 so as to rotate about the axis 14. The panel 44 is for example firmly fixed to a shaft 45 mounted in a housing 46 of the lid 13. The housing 46 is coaxial with the axis 14. The shaft 45 is connected to a handle 47 located outside the lid 13, which allows the user to rotate the shaft 45 manually. The panel 44 preferably has a surface slightly higher than the opening 43, but is not rotational symmetrical with respect to the axis 14. Thus, when rotating the handle 47, one alternately opens and closes the opening 43.

Preferably, the panel 44 is opposite the handle 47 with respect to a plane perpendicular to the axis 14. Thus, when the handle 47 is perpendicular to the opening 43, this opening is closed by the panel 44. This configuration prevent the operator from being burned by the steam going out through the opening, in particular when the food heating device 26 is working.

The shaft 45 can also be connected to a scraping arm 48 whose function is to remove food from an internal side wall 49 (FIG. 2) of the bowl 12 in order to bring them back to the knife 20. The arm 48 can be operated by the user by means of the handle 47. The panel 44 thus prevents the user using the arm 48 from being burned.

When a liquid preparation is contained in the bowl 12, the fast rotation of the knife 20 (FIG. 2) can cause the formation of a water column along the wall 49 of said bowl. There is then a risk of overflow of liquid through the off-centered opening 43, when the latter is not closed by the panel 44.

In order to prevent such an overflow, a internal wall 50 of the lid 13 supports a surface 51 having a substantially cylindrical shape along the axis 14.

The surface 51 is oriented towards a periphery of the lid and is located between said periphery and the opening 43. Preferentially, as in FIG. 2, the surface 51 is tangential to a edge 52 of the opening 43, close to the periphery of the lid.

The function of the surface 51 is to retain an upper part of a column of liquid formed by centrifugation of the contents in the bowl 12. The surface 51 prevents in particular the liquid from leaking through the opening 43 when the latter is not closed.

Advantageously, the surface 51 and the wall 49 of the bowl are at a radial distance 53 from each other, selected according to a maximum volume of liquid that can be treated by the processor 10.

Figure 6:
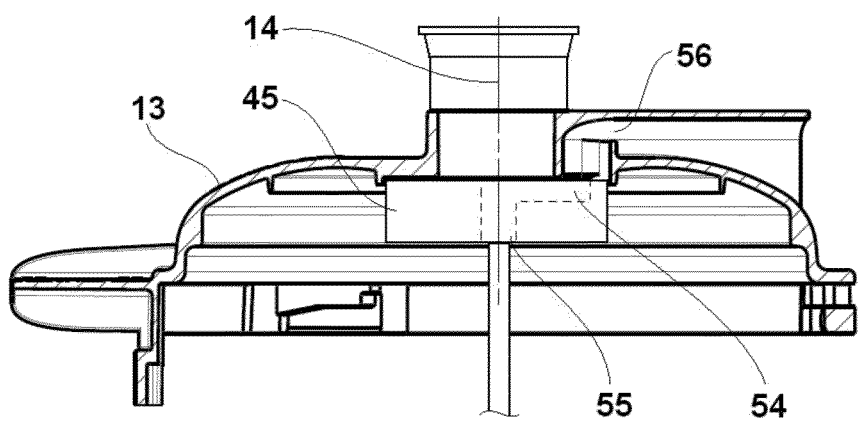
FIG. 6: a sectional view of a lid of a processor according to an embodiment of the invention.

FIG. 6 shows a sectional view of the lid 13 in FIG. 1, according to a plane perpendicular to that in FIG. 5.

In order to limit to the maximum the cases of overpressure in the bowl, even when the opening 43 is closed, the lid 13 is provided with a conduit 54 for evacuating steams. The conduit comprises an input 55, close to the axis 14 and leading into the interior of the bowl. In the example in FIG. 6, the input 55 is formed by a channel inside the shaft 45.

The conduit moreover comprises an output 56 which is off-centered with respect to the axis 14 and leads to the outside of the lid 13.

The invention claimed is:

1. Mechanical food treatment processor, comprising:
    a driving block topped by a bowl and comprising a motor connected to a rotation driving device;
    a food treatment tool comprising a coupling device to couple the food treatment tool to the rotation driving device;
    wherein the bowl is topped by a lid having an opening/closing system placed on the bowl and the lid is configured to rotate about a substantially vertical axis;
    wherein the lid comprises a safety device configured to block opening of the lid when an internal force, substantially parallel to the substantially vertical axis of rotation, is exerted upwardly on the lid;
    wherein the lid pivots with respect to the bowl, between a closing position and an opening position, the closing position enables the motor to operate and the opening position enables the lid to be raised, the opening position is an angular distance $\alpha$ from the closing position; and
    wherein the safety device comprises a blocking component to block the lid in a blocking position at an angular distance $\beta$ from the closing position, with $0<\beta<\alpha$.

2. The processor of claim 1, wherein the safety device comprises at least one projection supported by the bowl, cooperating with at least one blocking component supported by the lid, to block the lid from rotating about the substantially vertical axis when a force, substantially parallel to the substantially vertical axis, is exerted on the lid.

3. The processor of claim 1, further comprising another safety device to prevent the motor from operating when the lid deviates from an angle $\gamma$ from the closing position, with $0 \leq \gamma < \beta$.

4. The processor of claim 1, further comprising a seal providing a connection between the bowl and the lid, the seal comprising a substantially cylindrical part disposed along the substantially vertical axis of the bowl, and having a dimension to maintain a tight connection between the bowl and the lid when the lid is in the blocking position.

5. The processor of claim 4, wherein the seal having a plane of symmetry to permit assembly with the bowl and lid in two positions.

6. The processor of claim 1, wherein the lid comprises at least one introduction opening to introduce food into the bowl, the opening being off-centered with respect to the substantially vertical axis of the bowl; wherein the lid comprises an internal wall supporting a panel having a substantially cylindrical shape, oriented towards a periphery of the lid, located between the introduction opening and the periphery of the lid; and wherein the panel of the internal wall of the lid is substantially centered on the substantially vertical axis of the bowl when the lid is positioned on the bowl.

7. The processor of claim 6, wherein an internal side wall of the bowl is located at a radial distance from the panel, the radial distance being pre-selected according to a volume of liquid that can be treated by the bowl, so as to avoid an overflow of liquid through the introduction opening when the liquid is centrifuged by the food treatment tool.

8. The processor of claim 6, wherein the lid comprises a shaft mounted thereon and rotating about the substantially vertical axis of the bowl, the shaft being connected to a closing panel for closing the introduction opening, the panel being configured to alternately open and close the introduction opening when the shaft is rotating.

9. The processor of claim 8, wherein the shaft mounted on the lid comprises a handle positioned outside the lid, the handle being substantially opposite the closing panel.

10. The processor of claim 8, wherein the shaft mounted on the lid comprises a scraping arm to remove food from as at least one of an internal side wall of the bowl or an internal wall of the lid.

11. The processor of claim 1, further comprising a food heating device.

12. The processor of claim 11, wherein the lid comprises a conduit to exhaust steam from the bowl, the conduit comprising a first end near a center of the lid and leading into the bowl and a second end offset from the center of the lid and leading to the outside of the bowl.

* * * * *